(12) United States Patent
Kusumoto et al.

(10) Patent No.: US 6,771,040 B2
(45) Date of Patent: Aug. 3, 2004

(54) CONTROL APPARATUS AND CONTROL METHOD OF ON-VEHICLE DYNAMO-ELECTRIC MACHINE

(75) Inventors: Katsuhiko Kusumoto, Tokyo (JP); Noriyuki Wada, Tokyo (JP); Masakazu Nakayama, Tokyo (JP); Shinji Nishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 10/201,890

(22) Filed: Jul. 25, 2002

(65) Prior Publication Data

US 2003/0030409 A1 Feb. 13, 2003

(30) Foreign Application Priority Data

Aug. 10, 2001 (JP) ..................................... P2001-244724

(51) Int. Cl.[7] .............................. H02P 5/34; H02P 7/36; H02P 11/00
(52) U.S. Cl. ........................ 318/801; 318/140; 322/24; 322/37; 290/38 R; 290/36 R
(58) Field of Search ................................ 318/801, 778, 318/140, 139, 141, 146, 147, 148, 157, 811; 322/24, 37; 290/38 R, 36 R; 363/175

(56) References Cited

U.S. PATENT DOCUMENTS

| | | | | |
|---|---|---|---|---|
| 5,006,768 A | * | 4/1991 | Rozman | 318/254 |
| 5,051,670 A | * | 9/1991 | De Piola | 318/434 |
| 5,075,616 A | * | 12/1991 | Mitsui | 322/10 |
| 5,461,293 A | * | 10/1995 | Rozman et al. | 318/603 |
| 5,493,201 A | * | 2/1996 | Baker | 322/10 |
| 5,495,127 A | * | 2/1996 | Aota et al. | 290/31 |
| 5,512,813 A | * | 4/1996 | Uchinami | 322/28 |
| 5,594,322 A | * | 1/1997 | Rozman et al. | 322/10 |
| 5,650,713 A | * | 7/1997 | Takeuchi et al. | 322/16 |
| 5,747,971 A | * | 5/1998 | Rozman et al. | 322/10 |
| 6,278,194 B1 | | 8/2001 | Nakagawa et al. | |
| 6,462,429 B1 | * | 10/2002 | Dhyanchand et al. | 290/31 |

FOREIGN PATENT DOCUMENTS

| | | | | |
|---|---|---|---|---|
| JP | 59-156172 | | 9/1984 | |
| JP | 61031000 A | * | 2/1986 | H02P/9/14 |
| JP | 63277499 | | 11/1988 | |
| JP | 7-247857 A | | 9/1995 | |
| JP | 8214470 | | 8/1996 | |
| JP | 9019194 | | 1/1997 | |
| JP | 9-140004 A | | 9/1997 | |
| JP | 2000-209891 A | | 11/2000 | |
| JP | 2000316298 A | * | 11/2000 | H02P/9/04 |

* cited by examiner

*Primary Examiner*—Robert Nappi
*Assistant Examiner*—Patrick Miller
(74) *Attorney, Agent, or Firm*—Sughrue Mion, PLLC

(57) ABSTRACT

A control apparatus and a control method of an on-vehicle dynamo-electric machine 1 are provided for efficiently controlling functions as a starter-motor and as a charging generator. In case that the dynamo-electric machine 1 acts as a charging generator, when a rotation speed of the dynamo-electric machine 1 is not higher than a predetermined value, a power is generated by applying a compensation current from and inverter to an armature coil 3 for phase control. On the other hand, when a rotation speed of the dynamo-electric machine 1 is not lower than a predetermined value, operation of the inverter is stopped. Thus, controlling a current applied to a field coil 4 by a field coil current control means 5 generates a predetermined target voltage.

8 Claims, 5 Drawing Sheets

CONTROL APPARATUS AND CONTROL METHOD OF ON-VEHICLE DYNAMO-ELECTRIC MACHINE

BACKGROUND OF THE INVENTION

1. Field of the Invention

The present invention relates to a control apparatus of an on-vehicle dynamo-electric machine that is mounted on a vehicle to act as a starter-motor at the time of starting an internal combustion engine and as a generator after starting the internal combustion engine. The invention also relates to a control method of the on-vehicle dynamo-electric machine.

2. Description of the Related Art

In an internal combustion engine mounted on a vehicle, it is often required to reduce number of parts mounted on the internal combustion engine and secure a space enough for an engine room. For that requirement, a motor dynamo (hereinafter referred to as dynamo-electric machine) capable of acting both as a starter-motor for starting the internal combustion engine and as a generator for charging batteries may be used. Dynamo-electric machines for use in vehicles may be classified into two types. One is a dynamo-electric machine that is employed in so-called hybrid vehicles and is directly coupled with a crankshaft of an internal combustion engine to act for starting the internal combustion engine and driving the vehicle, as disclosed in the Japanese Patent Laid-Open (unexamined) No. 140004/1997. Another is a dynamo-electric machine having only the function of starting the internal combustion engine, as disclosed in the Japanese Patent Laid-Open (unexamined) No. 247857/1995. From the viewpoint of securing a space enough for the engine room, the latter having only the starting function is generally employed, and in which case the internal combustion engine and the dynamo-electric machine are connected via any belt or chain and put on practical use.

In such dynamo-electric machine, a three-phase synchronous motor and a generator are usually employed. In case of using the dynamo-electric machine as a motor, power is supplied from an on-vehicle battery via an inverter. In the inverter, transistors (IGBT) or the like are usually used as switching elements. The switching elements are connected in the form of a three-phase bridge and controlled by PWM signal or the like, thus supplying a three-phase ac to the dynamo-electric machine. Diodes are inverse-parallel connected to each switching element to form a rectifier circuit as disclosed in the mentioned the Japanese Patent Laid-Open (unexamined) No. 140004/1997. In case of using the dynamo-electric machine as a generator, the output power of the generator is rectified by the rectifier circuit and charges the batteries.

In the mentioned prior art, in the case of using the dynamo-electric machine as a motor, the switching elements are controlled by PWM signal to supply the dynamo-electric machine with an ac power. On the other hand, in the case of using the dynamo-electric machine as a generator, field currents are controlled to use the dynamo-electric machine as a generator of a constant voltage. It is to be noted that in the mentioned conventional arrangement, both characteristics as a motor and as a generator are low as compared with an arrangement in which a starter-motor and a charging generator are separately disposed. In the technical field of synchronous generator, a technique for controlling a generated voltage is known, in which a generated voltage is controlled by applying a phase controlled compensation current from an inverter to an armature coil. Application of such a control technique to an on-vehicle dynamo-electric machine may be certainly effective from the viewpoint of improving the performance at a low speed. However, the on-vehicle dynamo-electric machine is operated over a wide range of rotation in actual use, and therefore there arise various disadvantages in employing the mentioned control technique.

For example, it is herein supposed that a mode for generating a power by applying a phase-controlled compensation current from an inverter to an armature coil is referred to as "inverter generation mode". In the case that such an inverter generation mode is applied to an on-vehicle dynamo-electric machine, when the generated voltage of the armature coil comes up to a certain level, the application of the compensation current becomes impossible due to increase in rotation speed. Eventually, voltage control falls within a state of incapability. Moreover, because the on-vehicle dynamo-electric machine is used while the rotation speed being increased by the internal combustion engine, the voltage control becomes incapable in the range of relatively low rotation speed.

SUMMARY OF THE INVENTION

The present invention was made to solve the above-discussed problems and has an object of providing a control apparatus and a control method of an on-vehicle dynamo-electric machine, in which a function as a starter-motor and a function as a charging generator can be both efficiently controlled by shifting from the inverter generation mode to the normal generation in response to the rotation speed of the dynamo-electric machine and eliminating troubles incidental to such shift.

To accomplish the foregoing object, a control apparatus of an on-vehicle dynamo-electric machine according to the invention includes: an armature coil and a field coil; a dynamo-electric machine for acting as a starter-motor and as a charging generator that is combined with an on-vehicle internal combustion engine; switching elements that are bridge connected; an inverter for supplying an ac to the armature coil of the dynamo-electric machine; a field current control means for controlling a current of the field coil; and control means for applying a PWM signal to the switching elements of the inverter and controlling the a current supplied to the field coil. In case that the dynamo-electric machine acts as a charging generator, when a rotation speed of the dynamo-electric machine is not higher than a predetermined value, the control means generates power by applying a compensation current for phase control from the inverter to the armature coil. On the other hand, when a rotation speed of the dynamo-electric machine is not lower than a predetermined value, the control means stops the operation of the inverter. Thus, controlling the current applied to the field coil by the field coil current control means generates a predetermined target voltage.

As a result of such arrangement, it is now possible to obtain an output power from the dynamo-electric machine enough to cover a wide rotation range from a low-speed rotation range to a high-speed rotation range, making it possible to carry out smoothly charging the battery.

A method of controlling an on-vehicle dynamo-electric machine according to the invention is to control an on-vehicle dynamo-electric machine being mounted on an internal combustion engine for vehicles, acting as a starter-motor at the time of starting the internal combustion engine and as a charging generator after starting the internal combustion engine. In case that the dynamo-electric machine acts as a charging generator, a target voltage is generated by controlling a field current under normal operating condition. On the other hand, under the conditions that engine speed of the internal combustion engine is lowered and a voltage generated by the dynamo-electric machine does not reach the target voltage, a power is generated by applying a compensation current for phase control from on-vehicle batteries to an armature coil of the dynamo-electric machine via an inverter.

As a result, it is possible to achieve a control method of an on-vehicle dynamo-electric machine capable of extracting an output power from the dynamo-electric machine enough to cover a wide rotation range from a low-speed rotation range to a high-speed rotation range.

Other objects, features and advantages of the invention will become apparent in the course of the following description with reference to the accompanying drawings.

BRIEF DESCRIPTION OF THE DRAWINGS

In the drawings forming a part of the present application, in which the same reference numerals are designated to the same or like parts throughout the same.

DESCRIPTION OF THE PREFERRED EMBODIMENTS

Embodiment 1

Figure 1:
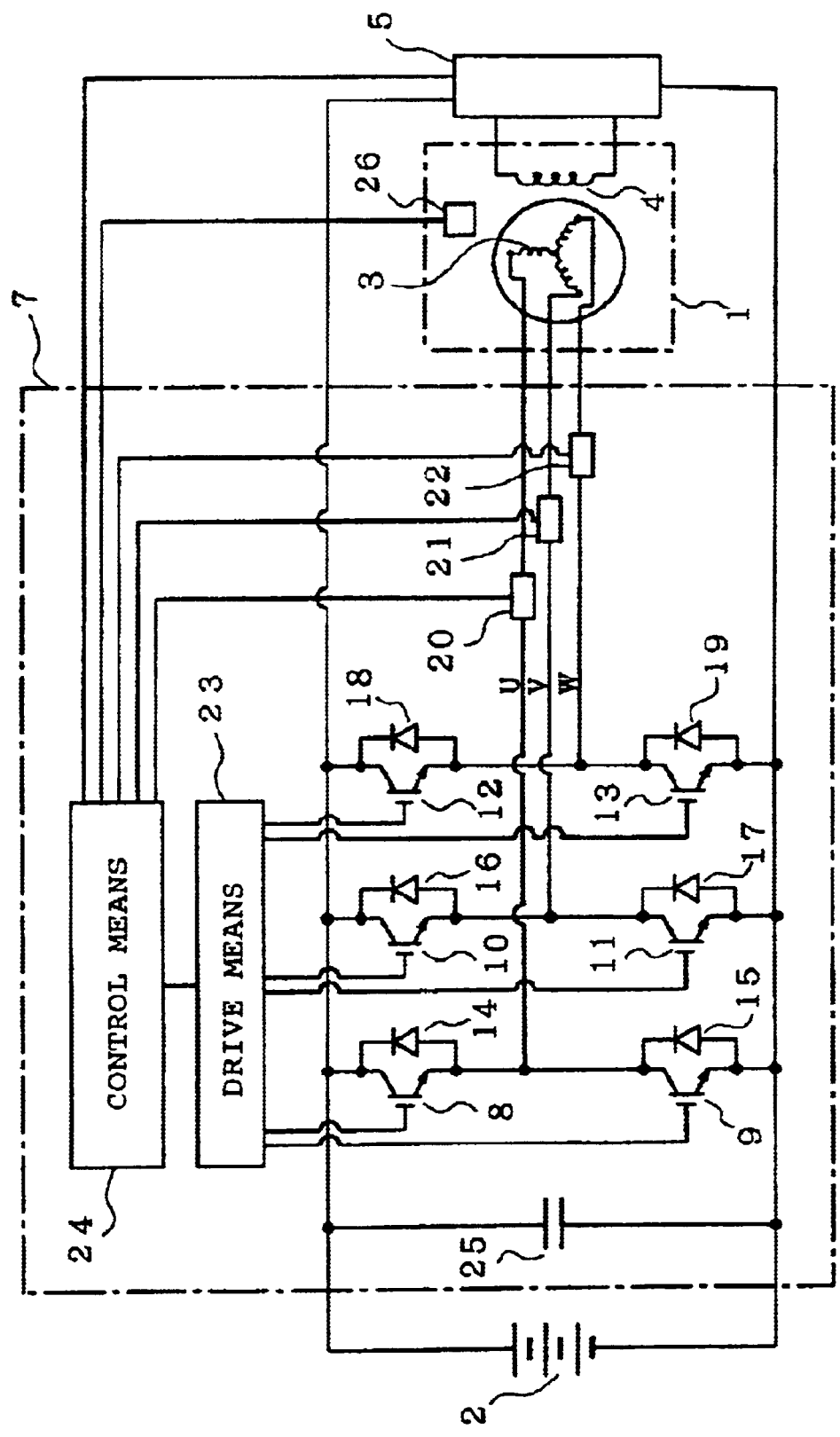
FIG. 1 is a schematic circuit diagram to explain a control apparatus and a control method of an on-vehicle dynamo-electric machine according to Embodiment 1 of the present invention.
Figure 2:
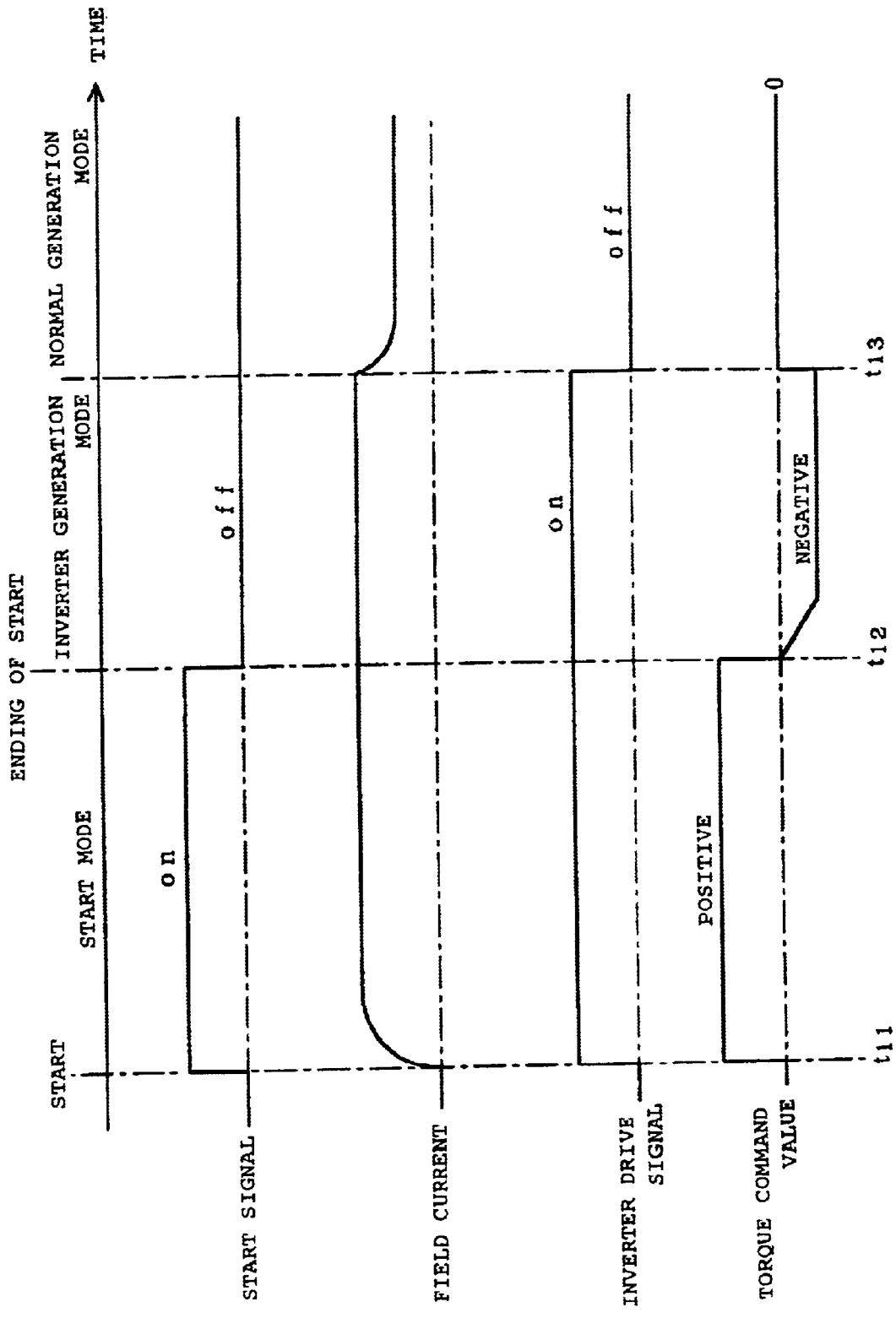
FIG. 2 is a schematic diagram to explain operation in the control apparatus and the control method of the on-vehicle dynamo-electric machine according to Embodiment 1 of the invention.

FIGS. 1 and 2 are to explain a control apparatus and a control method of an on-vehicle dynamo-electric machine according to Embodiment 1 of the present invention. FIG. 1 is a schematic connection diagram of the on-vehicle dynamo-electric machine and the control apparatus, and FIG. 2 is an explanatory diagram showing an example of operation sequence.

Referring to FIG. 1, reference numeral 1 denotes a dynamo-electric machine mounted on an internal combustion engine for vehicle (not illustrated), and the dynamo-electric machine 1 is connected to the internal combustion engine via belts, chains or the like. The dynamo-electric machine 1 is used as a starter-motor for starting the internal combustion engine (not illustrated) and as a charging generator for charging on-vehicle batteries 2. The dynamo-electric machine is a synchronous generator comprised of a stator having a three-phase armature coil 3 and a rotor having a field coil 4. A field current is supplied from the batteries 2 to the field coil 4 via field current control means 5. At the time of generating a power, the field current control means 5 controls a field current, thereby controlling an output voltage of the armature coil 3 to be a target voltage, and carries out a further control of the field current as described later in Embodiments 1 to 3.

A control unit 7 controls the dynamo-electric machine 1. The control unit 7 includes: an inverter circuit in which switching elements 8 to 13 such as IGBT are three-phase bridge connected; diodes 14 to 19 inverse-parallel connected to each switching element 8 to 13, thereby forming a rectifier circuit; current detecting means 20 to 22 for each phase; drive means 23 for driving each switching element 8 to 13 of the inverter circuit by a PWM signal; and control means 24 for controlling a function of the dynamo-electric machine as a starter-motor and a function as a charging generator by inputting current values from the current detecting means 20 to 22 for each phase and a rotational position of the dynamo-electric machine detected by a rotational position sensor 26.

In the combination of inverter circuit and the rectifier circuit, the switching element 8 and the diode 14 form an upper arm of U-phase, and the switching element 9 and the diode 15 constitute a lower arm of U-phase. In the same manner, the switching element 10 and the diode 16 form an upper arm of V-phase, and the switching element 11 and the diode 17 constitute a lower arm of V-phase. Likewise, the switching element 12 and the diode 18 form an upper arm of W-phase, and the switching element 13 and the diode 19 constitute a lower arm of W-phase. Junctions between the upper and lower arms of each phase are connected to the armature coil 3 for each phase. In addition, a capacitor 25 smoothes the current of the inverter circuit, and the rotational position sensor 26 measures a rotational position of the rotor of the dynamo-electric machine 1 as described above.

In the control apparatus of the on-vehicle dynamo-electric machine according to this Embodiment 1 of above constitution, at the time of starting the internal combustion engine, the control means 26 puts the drive means 23 into operation, and gives a PWM signal to the switching elements 8 to 13. The PWM signal is conforming to a rotational position of the dynamo-electric machine 1 detected by the rotational position sensor 26. Thus, the dynamo-electric machine 1 is driven as a synchronous motor. After starting the internal combustion engine, the dynamo-electric machine 1 acts as a synchronous generator. When the rotation speed is lower than a predetermined level, the control means 24 causes the switching elements 8 to 13 to operate so as to supply compensation current to the armature coil 3. The compensation current controls the output of the dynamo-electric machine 1 in such a manner that a phase of the generated current flowing into the armature coil 3 conforming to the load of the battery 2 may be equivalently either a leading current (strong field) or a lagging current (weak field). This control state is hereinafter referred to as "inverter generation mode".

When the rotation speed of the dynamo-electric machine 1 exceeds a predetermined value reaching a rotation speed level enough to obtain a required generated voltage, the control means 24 detects that the generated voltage of the armature coil 3 exceeds the predetermined value and stops the operation of the switching elements 8 to 13, i.e., operation of the inverter. At the same time, the control means 24 controls the dynamo-electric machine 1 so that dynamo-electric machine 1 charges the battery 2 while being controlled to a target voltage by the operation of the field current control means 5. This control state is hereinafter referred to as "normal generation mode". In both inverter generation mode and normal generation mode, the output from the dynamo-electric machine 1 charges the battery 2 composed of the diodes 14 to 19 via a full wave rectifier circuit.

The operation sequence in FIG. 2 shows the mentioned operation process. That is, when the start signal is turned ON at a time t11, a torque command value for starting the internal combustion engine is outputted from the control means 24. Thus a PWM signal having a predetermined duty ratio is delivered to the inverter circuit, whereby the dynamo-electric machine 1 comes to acts as a synchronous motor. When it is judged at a time t12 that the start of the internal combustion engine has completed, the torque command from the control means 24 is switched to a negative value. In conformity with this negative torque command value, the PWM signal from the drive means 23 is switched to compensation current to the armature coil 3. The compensation current is controlled depending upon rotation speed of the dynamo-electric machine 1 and load of the battery 2. In case that the rotation speed of the dynamo-electric machine 1 increases and a generated voltage comes to exceed a predetermined value at a time t13, the mode is switched to the normal generation mode. Thus, the torque command value from the control means 24 comes to zero, whereby the field current is controlled by the field current control means 5. In addition, a positive torque command value means a current command as the motor, a negative torque command value means a current command as the inverter generation mode, and zero means a command for stopping the operation of the inverter.

When the dynamo-electric machine 1 acts as a power generating motor, in view of satisfying motor characteristics at the time of start, it is certain that power generation characteristics, in particular, power generation characteristics at the time of low rotation speed are obliged to be sacrificed. But, by making controls as described so far, it becomes possible to charge the battery 2 from the low rotation speed range. At the time when the rotation speed increases thereby increasing the voltage generated by the dynamo-electric machine 1 and making it impossible to supply the compensation current from the inverter to the armature coil 3, the control means 24 interrupts giving the PWM signal from the drive means 23 to each switching element 8 to 13, and switches to the power generation under the control by the field current control means 5. Consequently, it is now possible to charge the battery 2 smoothly covering a wide rotation range from a low-speed rotation range to a high-speed rotation range.

Embodiment 2

Figure 3:
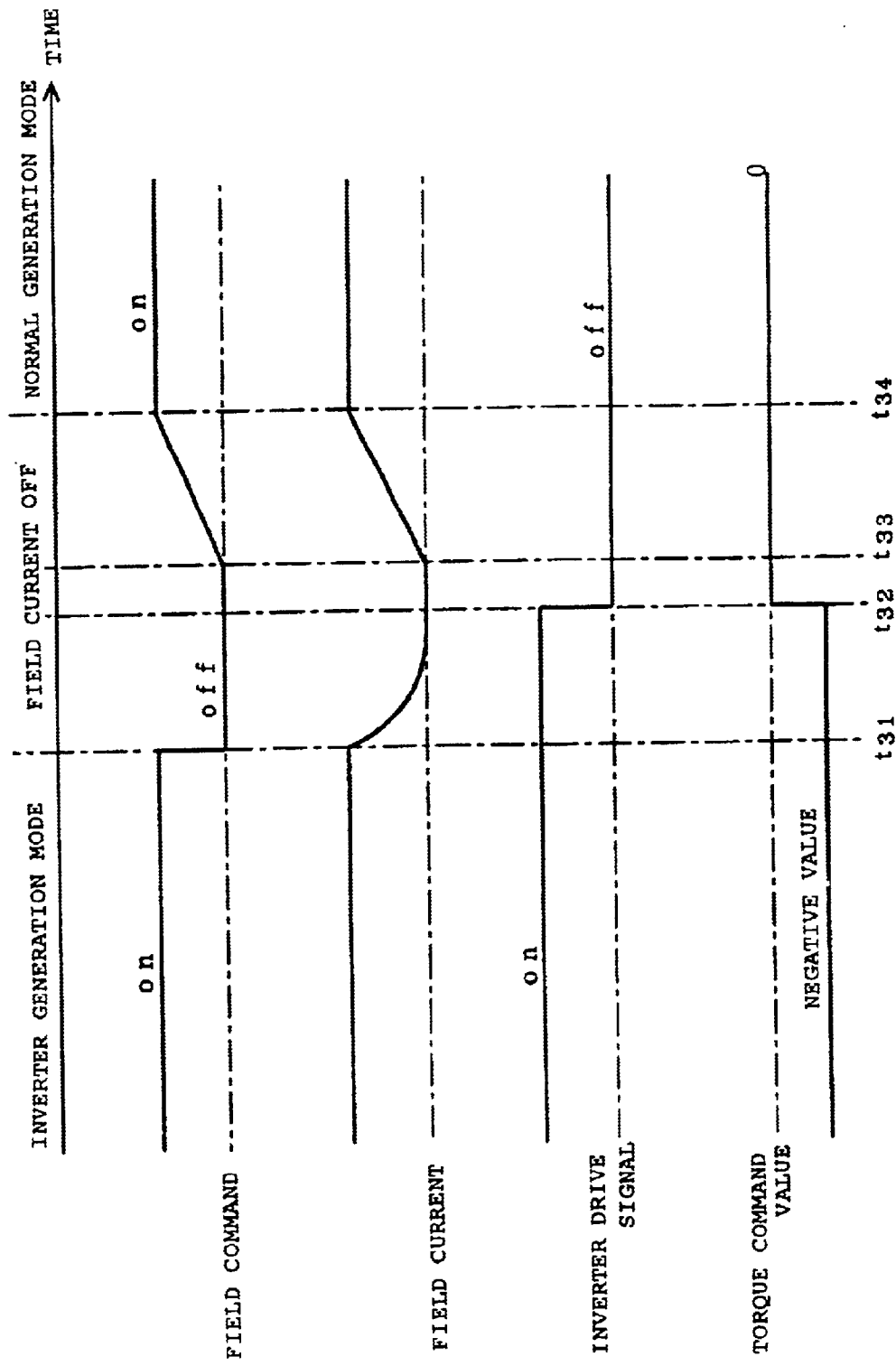
FIG. 3 is a schematic diagram to explain operation in the control apparatus and the control method of the on-vehicle dynamo-electric machine according to Embodiment 2 of the invention.
Figure 4:
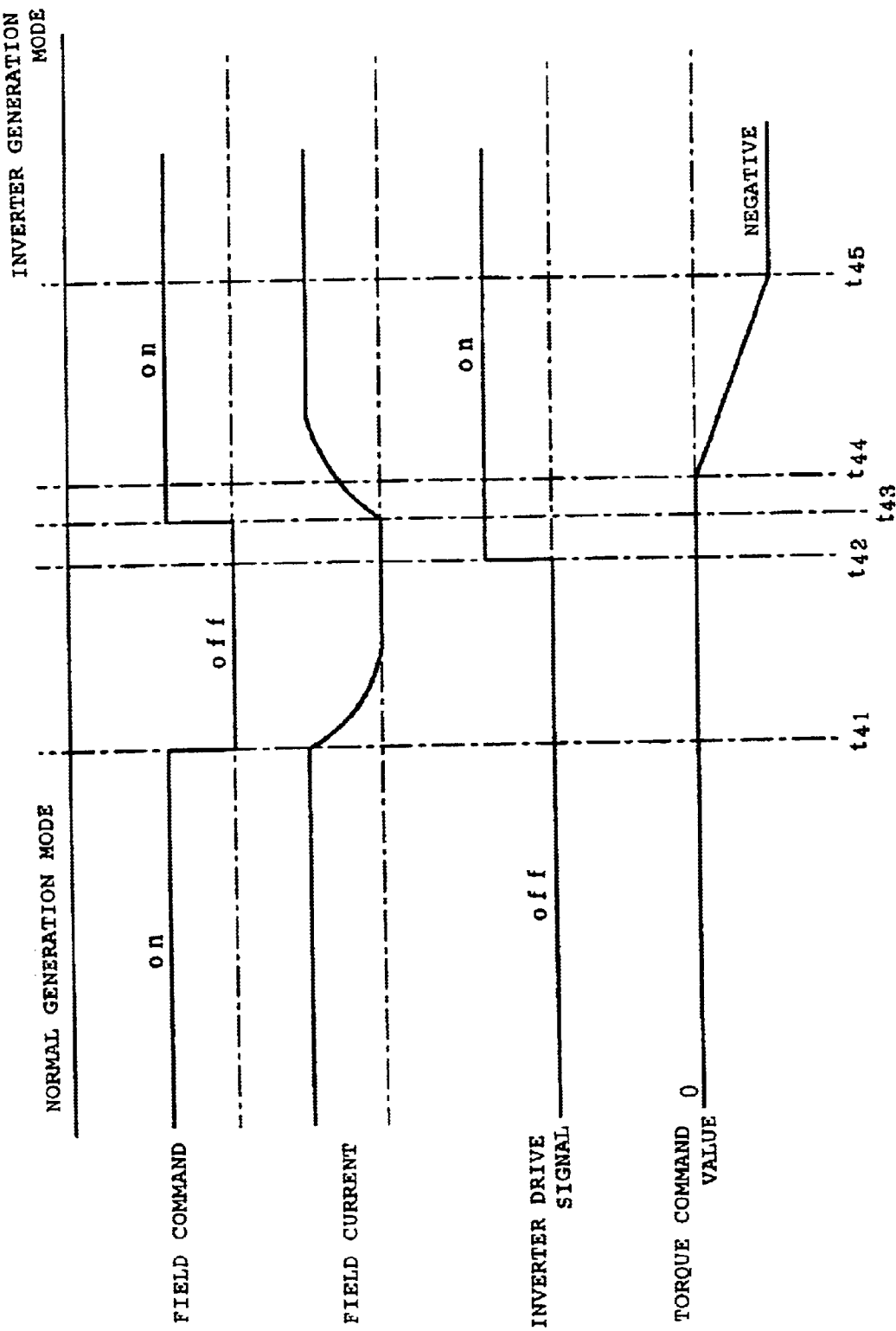
FIG. 4 is a schematic diagram to explain operation in the control apparatus and the control method of the on-vehicle dynamo-electric machine according to Embodiment 2 of the invention.

FIGS. 3 and 4 show an example of operation sequence to explain the control apparatus and the control method of the on-vehicle dynamo-electric machine according to Embodiment 2 of the invention. In the event that the rotation speed of the dynamo-electric machine 1 described in the foregoing Embodiment 1 fluctuates during the power generating operation, thereby the generated voltage coming to fluctuate exceeding or lowering a predetermined value, switching takes place between the inverter generation mode and the normal generation mode. This Embodiment 2 intends to overcome troubles easy to occur in the case of carrying out the switching between the inverter generation mode and the normal generation mode.

The operation sequence in FIG. 3 shows an example of control made at the time of transition from the inverter generation mode to the normal generation mode. In such a transition from the inverter generation mode to the normal generation mode, a PWM signal delivered from drive means 23 to each switching element 8 or 13 is interrupted to quit the inverter generation mode. However, when the current delivered to the armature coil 3 is in a state of a weak field, as a result of interrupting this weak field, a voltage conforming to a rotating speed of the dynamo-electric machine 1 is generated. Accordingly, a high voltage is temporally applied to the circuit elements such as switching element 8 to 13, which may bring about an over-voltage breakdown.

As shown in FIG. 3, in the control according to this embodiment, at the time of transition from the inverter generation mode to the normal generation mode, first, a command for switching the field currents to zero is issued from the control means 24 at t31. Thus the field current control means 5 interrupts the field current. As shown in the drawings, the field current comes to zero after passing a time conforming to a time constant of the field coil 4. Subsequently the torque command value from the control means 24 comes to zero at t32, thereby the PWM signal from the drive means 23 being interrupted. After interrupting the PWM signal, at t33, the control means 24 gradually increases the field current by operating the field current control means 5, and the transition to the normal generation mode completes at t34.

In this manner, at the time of the transition from the inverter generation mode to the normal generation mode, the PWM signal is interrupted after interrupting the field current for a time longer than the time constant of the field coil 4. Accordingly the generated voltage of the dynamo-electric machine 1 lowers sufficiently. Therefore the transition to the power generation mode can be performed without generating any over-voltage breakdown of the circuit elements, even when weak field of the inverter is interrupted.

The operation sequence in FIG. 4 shows a transiting from the normal generation mode to the inverter generation mode. At the time of transition, first, a command for switching the field currents to zero is issued from the control means 24 at t42, thus the current field control means 5 interrupts the field current. Subsequently, in the state that the field current is zero, a PWM signal is outputted from the drive means 23 at t42, thereby an application of a current to the armature coil 3 being started. Thus the field is again turned ON at t43. A torque command from the control means 24 is issued at t44, and the inverter controls a current of the armature coil 3 according to the torque command.

At the time of transition from the normal generation mode to the inverter generation mode, if a voltage generated by the dynamo-electric machine 1 is high, any current cannot be applied from the inverter to the armature coil 3, thereby falling within control incapability. However, in this embodiment, a generated voltage of the dynamo-electric machine 1 lowers at the time of switching by securing a period of interrupting the field current as described above. As a result, a current compensation can be supplied from the inverter to the armature coil 3 and the control incapability can be avoided.

Embodiment 3

Figure 5:
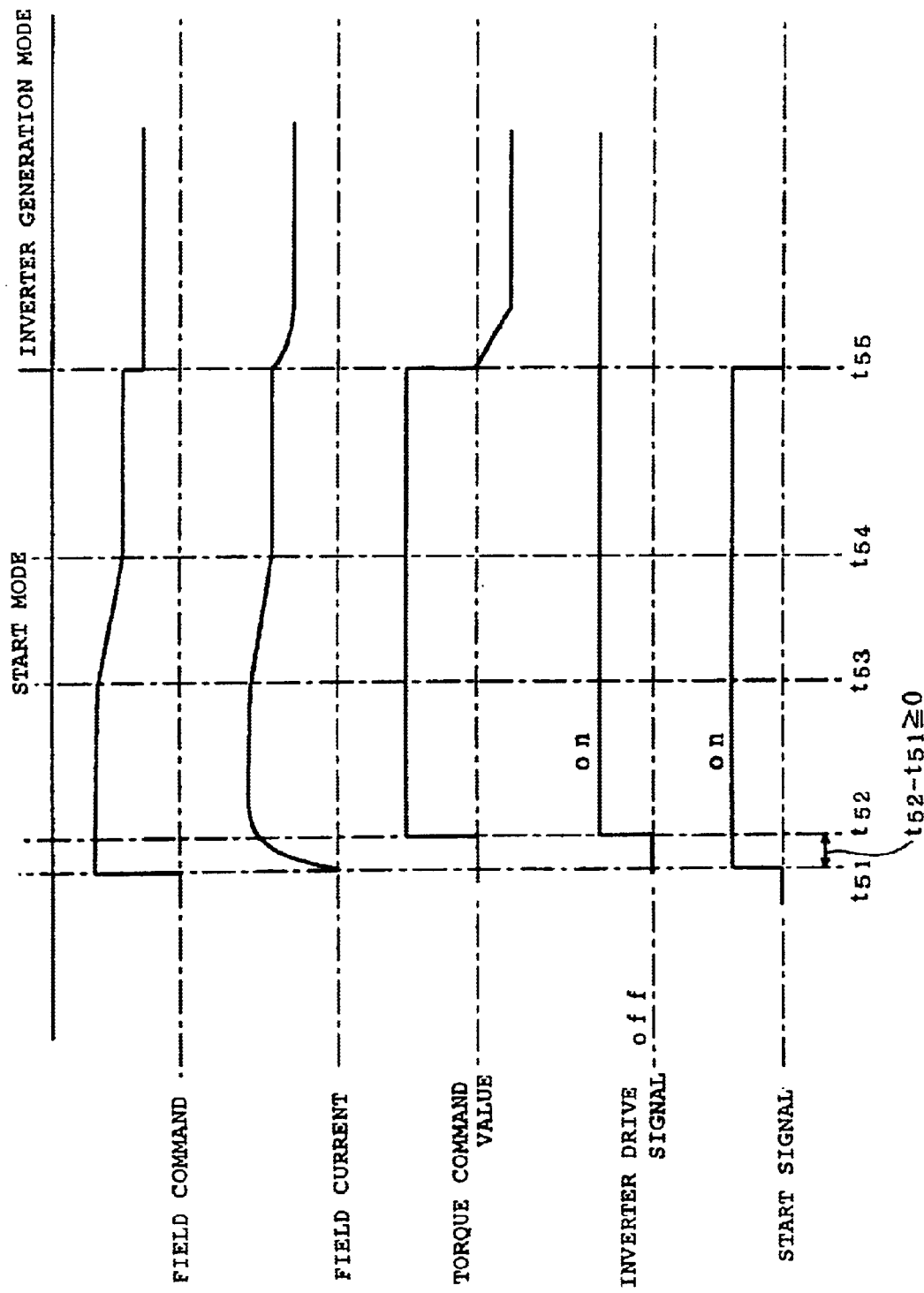
FIG. 5 is a schematic diagram to explain operation in the control apparatus and the control method of the on-vehicle dynamo-electric machine according to Embodiment 3 of the invention.

FIG. 5 shows an example of operation sequence to explain the control apparatus and control method of on-vehicle dynamo-electric machine according to Embodiment 3 of the invention. This embodiment intends to improve starting performance in case of using the dynamo-electric machine 1 as a starter-motor of an internal combustion engine.

In the operation sequence shown in FIG. 5, when a starting signal is ON, first, a field command is issued by the control means 24. This command is set such that a magnetomotive force is larger than the normal field current (rated value of field current), whereby a state is achieved, in which the magnetomotive force and magnetic flux generated by the field coil 4 is increased. Subsequently, a positive torque command value is issued from the control means 24 at t52, and a gate signal (PWM signal) is delivered to each switching element 8 to 13. It is also preferable that t51 and t52 come at the same timing. In this manner, a start torque of the dynamo-electric machine is increased, and the internal combustion engine is early started.

When passing a predetermined time from t52 and coming to t53, the field current is returned to a normal current value (rated value) during the period from t53 to t54. When completing the start of the internal combustion engine at t55, the field current is controlled to be a field current value suitable for power generation, and the dynamo-electric machine 1 comes to a state of the inverter generation mode. When the dynamo-electric machine 1 acts as a power generation motor, it is certainly difficult to satisfy sufficiently both start characteristics and power generation characteristics. But by carrying out the above-described control, a torque at the time of starting can be sufficiently large so that an internal combustion engine may be started early without fail.

In addition, when the start signal is ON at the mentioned t51, entering into the starting operation is possible only on the condition that a rotation speed of the internal combustion engine is not higher than a predetermined value. Accordingly, when a rotation speed of the internal combustion engine exceeds a predetermined value, the control means 24 is constituted so as not to deliver any gate signal to each switching element 8 to 13 even if the start signal is ON. Such a constitution prevents any unnecessary application of a current to the dynamo-electric machine 1 during the operation of the internal combustion engine due to an erroneous manipulation. As a result, it is possible to preliminarily prevent a breakdown accident at the part such as a mechanism for combination between an internal combustion engine and the dynamo-electric machine 1.

In addition, the mentioned control apparatus of an on-vehicle dynamo-electric machine according to the invention has features and advantages as follows.

At the time of shifting from a power generation by application of a current by the inverter to a power generation of a target voltage by controlling the field current, as well as at the time of shifting from a power generation of a target voltage by controlling the field current to a power generation by application of a current by the inverter, the control means preferably interrupts the filed current for a predetermined time.

As a result, even when the application of a current is of weak field, it is possible to prevent the circuit elements from over-current breakdown due to interruption of the field current, thus a control apparatus capable of preventing falling within control incapability can be obtained.

Further, when the dynamo-electric machine acts as a starter-motor, the control means preferably controls the field current control means so as to increase the field current to not lower than a rated value.

As a result, it is possible to compensate sufficiently the performance of the power generation motor, thereby sufficiently increasing the start torque, and obtain a dynamo-electric machine capable of starting the internal combustion engine early without fail.

Further, when the dynamo-electric machine acts as a starter-motor, the control means preferably detects a rotation speed of the dynamo-electric machine, and any power is not supplied to the dynamo-electric machine in the event that the rotation speed before turning on the power is exceeding a predetermined value.

As a result, it is possible to prevent any unnecessary application of a current to the dynamo-electric machine due to an erroneous manipulation, and preliminarily prevent a breakdown accident at the part such as a mechanism for combination between an internal combustion engine and the dynamo-electric machine.

Furthermore, the mentioned control method of an on-vehicle dynamo-electric machine according to the invention has features and advantages as follows.

At the time of shifting from a power generation by application of a current by the inverter to a power generation of a target voltage by controlling the field current, as well as at the time of shifting from a power generation of a target voltage by controlling the field current to a power generation by application of a current by the inverter, the filed current is preferably interrupted for a predetermined time, and the shifting is carried out after dropping the voltage generated by the dynamo-electric machine.

As a result, even when the application of a current is of weak field, it is possible to prevent the circuit elements from over-current breakdown due to interruption of the field current, thus a control method capable of preventing falling within control incapability can be obtained.

Further, when the dynamo-electric machine acts as a starter-motor for starting an internal combustion engine, the field current control is preferably increased to not lower than a rated value.

As a result, it is possible to obtain a large start torque, and achieve a control method capable of starting the internal combustion engine early without fail.

Further, when the dynamo-electric machine acts as a starter-motor, a rotation speed of the dynamo-electric machine is preferably detected, and the dynamo-electric machine does not act as a starter-motor in the event that the rotation speed is exceeding a predetermined value.

As a result, it is possible to prevent any unnecessary application of a current to the dynamo-electric machine, and preliminarily prevent a breakdown accident at the part such as a mechanism for combination between an internal combustion engine and the dynamo-electric machine.

What is claimed is:

1. A control apparatus of an on-vehicle dynamo-electric machine comprising:

an armature coil and a field coil;

the dynamo-electric machine acting as a starter-motor and as a charging generator that is combined with an on-vehicle internal combustion engine;

switching elements that are bridge connected to form an inverter for supplying an alternating current to said armature coil of said dynamo-electric machine;

a field current control means for controlling a current of said field coil; and control means for applying a PWM signal to the switching elements of the inverter and controlling the current supplied to said field coil;

wherein, when said dynamo-electric machine acts as a charging generator, if a rotation speed of said dynamo-electric machine is less than a predetermined value, said control means generates power by controlling said inverter to apply a compensation current for phase control to said armature coil; and when the rotation speed of said dynamo-electric machine is greater than the predetermined value, said control means stops the operation of said inverter so that controlling the current applied to said field coil by said field coil current control means generates a predetermined target voltage.

2. The control apparatus of an on-vehicle dynamo-electric machine according to claim 1, wherein, at the time of shifting from power generation by application of current by said inverter, to the power generation at a target voltage by controlling said field current; as well as at the time of shifting from power generation of at the target voltage by controlling said field current to a power generation by application of the current by said inverter, said control means interrupts said field current for a predetermined time.

3. The control apparatus of an on-vehicle dynamo-electric machine according to claim 1, wherein, when said dynamo-electric machine acts as the starter-motor, said control means controls said field current control means so as to increase the field current to not lower than a rated value.

4. The control apparatus of an on-vehicle dynamo-electric machine according to claim 1, wherein, when said dynamo-electric machine acts as the starter-motor, said control means detects the rotation speed of said dynamo-electric machine, and power is not supplied to said dynamo-electric machine in the event that the rotation speed before turning on the power exceeds the predetermined value.

5. A method of controlling an on-vehicle dynamo-electric machine that is mounted on an internal combustion engine for vehicles and acts as a starter-motor at the time of starting said internal combustion engine and as a charging generator after starting said internal combustion engine, the method comprising when said dynamo-electric machine acts as a charging generator, generating a target voltage by controlling a field current when an engine speed of said internal combustion engine is lowered and a voltage generated by said dynamo-electric machine does not reach the target voltage, generating power by applying a compensation current for phase control from on-vehicle batteries to an armature coil of said dynamo-electric machine via an inverter.

6. The method of controlling an on-vehicle dynamo-electric machine according to claim 5, wherein at the time of shifting from power generation by application of the current by said inverter, to power generation at a target voltage by controlling said field current; and at the time of shifting from power generation at a target voltage by controlling said field current, to power generation by application of the current by said inverter, the field current is interrupted for a predetermined time, and the shifting is carried out after dropping the voltage generated by said dynamo-electric machine.

7. The method of controlling an on-vehicle dynamo-electric machine according to claim 5, wherein, when said dynamo-electric machine acts as the starter-motor for starting the internal combustion engine, the field current control is increased to not lower than a rated value.

8. The method of controlling an on-vehicle dynamo-electric machine according to claim 5, wherein, when said dynamo-electric machine acts as the starter-motor, a rotation speed of said dynamo-electric machine is detected, and the dynamo-electric machine does not act as the starter-motor in the event that the rotation speed exceeds a predetermined value.

* * * * *